United States Patent Office 2,996,471
Patented Aug. 15, 1961

2,996,471
REACTION PRODUCT OF AN AMINOHYDROXY COMPOUND WITH A COPOLYMER OF VINYL ACETATE AND CROTONIC ACID, COMPOSITIONS AND PRODUCTS THEREOF
Richard W. Reiter and Robert G. Horning, Plainfield, N.J., assignors to National Starch and Chemical Corporation, a corporation of Delaware
No Drawing. Filed June 23, 1958, Ser. No. 743,967
11 Claims. (Cl. 260—33.4)

This invention relates to a method for the modification of synthetic polymers in order to make them soluble both in organic solvents and in water, and to the products thus produced. More particularly, it is our object to produce modified copolymers of vinyl acetate and crotonic acid which, while retaining their solubility in organic solvents, are also water soluble. A prime object of this invention is to obtain films whose flexibility may be readily controlled and which are permanently soluble or dispersible in water, even though they are derived from copolymers which are not normally characterized by water solubility.

A further object is to produce modified copolymers which, beside their unique combination of organic solvent and water solubility are also soluble in anhydrous organic solvents, particularly ethanol, and which are compatible as well with the halogenated hydrocarbons ordinarily employed as aerosol propellants, this combination of properties making these modified copolymers particularly valuable for use in hair spray lacquer formulations. Still another object of this invention is the production of modified copolymers, of the type described, for use in adhesive compositions, to form adhesive films which are to be activated by water, organic solvents, or heat. The compositions of our invention have many uses in the coating and adhesive field, where one often encounters problems which call for the remarkable combination of properties found in these new polymers.

One of the especially useful and important applications of this invention lies in the field of aerosol formulations, particularly hair spray lacquers. The preparation of such lacquers requires that the resin used therein be soluble in anhydrous organic solvents; yet the films cast from such lacquers should ordinarily be water soluble, in order to facilitate their easy rinsing from the user's hair. This is an unusual combination of properties, and is further complicated by the requirement that the resin used in such lacquers be completely compatible with the propellants and solvents commonly used in aerosol formulations. The product of our invention has this unusual combination of properties.

With few exceptions, synthetic polymers are soluble either in organic solvents or in water, but not in both. Accordingly, films cast from organic solvent solutions are ordinarily insoluble in water. Among the limited number of polymers which are water-soluble are polyvinyl pyrrolidone and its copolymers with 70% or less of vinyl acetate. Polyvinyl methyl ether and its copolymers with maleic anhydride are other polymers possessing this property to a limited degree. Some polyelectrolytes (high molecular weight electrolytes) such as the copolymer of equimolar quantities of vinyl acetate and maleic acid, polyacrylic acid or polymethacrylic acid, are capable of reacting or dissolving, in water and are also soluble in organic solvents. However, all of these materials present difficulties when used in hair spray lacquers, these difficulties involving, in some cases, their high cost, or in others their tackiness, acidity, or limited solubility in water at high and low temperatures, or their tendency to interact with the perfumes and other components of such hair formulations.

Although copolymers of vinyl acetate and crotonic acid have certain properties which would appear to make them suitable for use in aerosol formulations such as hair spray lacquers, these copolymers are soluble only in organic solvents, but not in water. Thus, before being used for such purposes, the vinyl acetate-crotonic acid copolymers would first have to be treated so as to make them water-soluble. Various attempts have indeed been made to modify these, as well as other, vinyl acetate copolymers, so as to give them this desirable property of water solubility. These attempts usually involved reaction with an organic or inorganic base. The resulting neutralization products, however, tend to be soluble in water only at an alkaline pH. Furthermore, when a base such as potassium hydroxide is used for the reaction with the copolymer, it is found that when mixed with anhydrous ethanol (as would be required for many aerosol formulations), hydrolysis of the copolymer takes place, with formation of polyvinyl alcohol. The latter, being insoluble in ethyl alcohol, precipitates and of course ruins the formulation. When ammonia is used to neutralize the copolymer, films cast from solutions of such polymers tend to become water-insoluble upon aging, thus destroying their usefulness for many purposes.

We have now found that by reacting vinyl acetate-crotonic acid copolymers with those aminohydroxy compounds which have a boiling point above 160° C. at atmospheric pressure, and a molecular weight above 85, we obtain products which, while retaining their original organic solvent solubility, can also be readily dissolved in water. Furthermore, the water in which the resin is dissolved does not necessarily have to be alkaline. The films cast either from aqueous or organic solvent solutions of these modified copolymers retain their dual solubility characteristics (water and organic solvent), without apparent loss of solubility upon aging of the films. In addition, the films are clear and glossy, do not yellow upon aging, and possess the highly desirable properties of softness and flexibility. The modified copolymers are soluble in anhydrous solvents, such as anhydrous ethanol, and are completely compatible with aerosol propellants. Furthermore, they show little or no tendency to interact with the perfumes or other components of hair spray lacquer formulations.

As previously indicated, the modified copolymers of our invention have important uses other than in aerosol applications. Thus, films derived from these copolymers are valuable as adhesives, possessing an unusual combination of properties, namely, water solubility, organic solvent solubility and heat sealability, and may be used in bonding a variety of surfaces, including paper, wood, leather and the like. Thus, for example, an organic solvent solution of the adhesive (made with the modified copolymer) may be applied to one or both surfaces and adhesion effected by immediate contact between the surfaces, or, as an alternative, the organic solvent solution (i.e. lacquer) adhesive may be applied to one surface and permitted to dry. Thereafter, whenever it is desired to effect adhesion, the dried adhesive film may be activated either by moistening with water, or with organic solvent, or by application of heat. When we speak of the dried film as being "activated" we refer to the act of converting the film from a relatively non-sticky condition to a state of adhesive tackiness, so that it can be used to form an adhesive bond. Although some existing adhesives may combine one or two of these properties, it is most unusual for any one adhesive to possess all three of these properties.

In brief, our invention comprises the reaction products resulting from the addition of aminohydroxy compounds of the previously stated boiling point and molecular weight to copolymers of vinyl acetate and crotonic acid, and the unique films, coatings and adhesives derived from these modified copolymers. Aminohydroxy compounds may be defined as organic chemicals which contain both hydroxyl and amino groups. Representative aminohydroxy compounds include:

2-amino-2-methyl-1,3-propanediol

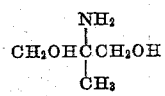

2-amino-2-ethyl-1,3-propanediol

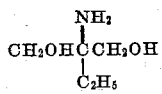

2-amino-2-methyl-1-propanol

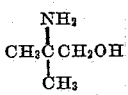

Tris(hydroxymethyl)-aminomethane

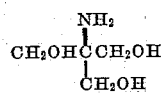

1-amino-2-methyl-2-propanol

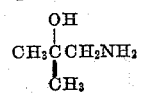

3-amino-2-pentanol

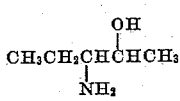

2-amino-1-phenyl-1-butanol

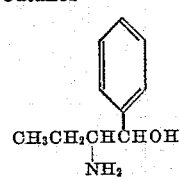

2-dimethylamino-2-methyl-1-propanol

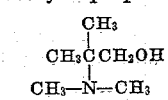

N¹-(2-hydroxyethyl)-2-methyl-1,2-propanediamine

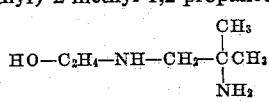

and,

Tris(hydroxymethyl)dimethylaminomethane

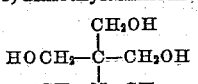

In addition to the above-named compounds, other representative aminohydroxy compounds, all suitable for the purposes of our invention, include:

2-amino-1-butanol
2-amino-2-methyl-3-pentanol
2-amino-1-phenyl-1-propanol
2-dimethylamino-2-methyl-1,3-propanediol
2-dimethylamino-2-ethyl-1,3-propanediol
N¹-(2-hydroxypropyl)-2-methyl-1,2-propanediamine As will be noted, all of the above aminohydroxy compounds (as well as the other compounds of this class) contain at least one amino group, whose structure may be either primary, secondary or tertiary; or they may contain a combination of two or more amino groups of the same or different structure (e.g., primary plus secondary, primary plus primary, etc.). In addition aminohydroxy compounds contain at least one hydroxyl group, which may be either primary, secondary or tertiary in structure; or they may contain a combination of two or more hydroxyl groups of the same or different structure. It will further be noted that in every one of the aminohydroxy compounds herein listed, the hydroxyl group is at least two carbon atoms removed from the nitrogen.

Aminohydroxy compounds are characterized by their relatively low volatility, lack of toxicity and substantial freedom from disagreeable odors. While there is naturally a variation in properties among the different aminohydroxy compounds, the practitioner will have no difficulty in selecting compounds having the combination of properties that best suits his requirements and yet fall within the stated range of boiling points and molecular weights required for the practice of this invention. As already indicated, it has been found that aminohydroxy compounds having a molecular weight lower than 85 or a boiling point lower than 160° C. are not suitable.

The reaction procedure is quite simple. It is merely necessary to mix the vinyl acetate-crotonic acid copolymer with a solution of the aminohydroxy compound in a suitable solvent. The particular solvent used will depend upon the formulation being prepared; thus, for hair spray lacquer formulations one might use anhydrous ethyl alcohol, while for other uses one might prefer other solvents. In any case, the solvent should be one in which both the aminohydroxy compound and the subsequent reaction product of the aminohydroxy compound with the vinyl acetate-crotonic acid copolymer are both soluble. Some representative examples of suitable solvents are ethyl alcohol, methyl acetate, ethyl acetate, isopropanol and methyl ethyl ketone. Ordinarily, we prefer to use ethyl alcohol, but as stated, the selection will depend to a great extent upon the particular formulation being prepared. Agitation, ordinarily at room temperature, brings the reaction to completion, and the reaction product is, of course, in the form of a solution in the organic solvent. Films or coatings may be cast from these solutions by any of the means well known to the art.

The copolymers of vinyl acetate and crotonic acid used in this invention may be prepared by any of the polymerization processes well known in the art. However, we prefer solution polymerization of the vinyl acetate and crotonic acid, followed by the step of dispersing the solution of the copolymer in water to convert the copolymer into relatively large particles, known as beads, or pearls, which are easily separated, washed and dried. However, while we prefer this physical form of the copolymer, for reasons of convenience in handling, the copolymer may be prepared by any other desired polymerization method, such as bulk, solution, emulsion or bead polymerization.

In reacting the copolymer with the aminohydroxy compound, the copolymer in the form of beads, or other desired form, may be added to a solution of the aminohydroxy compound in the selected solvent. Depending on the solvent selected, as well as on the crotonic acid content of the copolymer, it is sometimes possible to first dissolve the copolymer in the solvent and then add the aminohydroxy compound to this solution.

With regard to proportions, we have found that the vinyl acetate-crotonic acid copolymer used should be one which contains from about 7.5% to about 12.5% of crotonic acid, by weight of the copolymer. In other words, the relative proportions of vinyl acetate and crotonic acid in the copolymer are within the range 92.5:7.5 to 87.5:12.5, by weight.

The mount of aminohydroxy compound with which the vinyl acetate-crotonic acid copolymer is reacted has been found to affect not only the water solubility or dispersibility of the resulting modified copoler, but it also has an effect upon the flexibility of the films cast from the modified copolymer. Thus, as the relative proportion of the aminohydroxy compound is increased, up to and beyond the theoretical equimolar amount of crotonic acid in the copolymer, both the water solubility and film flexibility increase, in substantially direct relationship. We have found that quantities of aminohydroxy compound ranging from 25% to 175% of the theoretical equimolar amount of crotonic acid in the copolymer yield a modified copolymer having the desired degree of water solubility and flexibility. Thus, 100% of the theoretical equimolar amount would be that quantity calculated to be required for the reaction of all of the carboxyl groups in the copolymer (present, of course, as a result of the crotonic acid component) with the aminohydroxy compound.

With regard to the solids concentrations of the solutions of the modified copolymers of our invention, it is clear that this can be varied to give the practitioner the particular solids and viscosity he needs for the application involved. The range, for example, may be as low as 1-2% solids for certain aerosol applications and as high as 50-60% solids for adhesive coating applications.

In the following examples, which further illustrate the embodiment of our invention, all parts are given by weight unless otherwise indicated. In addition, for purposes of brevity, we refer to the various aminohydroxy compounds by combinations of letters, as follows:

2-amino-2-methyl-1,3-propanediol is referred to as AMPD
2-amino-2-ethyl-1,3-propanediol is referred to as AEPD
2-amino-2-methyl-1-propanol is referred to as AMP
Tris(hydroxymethyl)-aminomethane is referred to as THMAM
2-amino-2-methyl-3-pentanol is referred to as AMPN
1-amino-2-methyl-2-propanol is referred to as AMPR
3-amino-2-pentanol is referred to as AMPE
2-amino-1-phenyl-1-butanol is referred to as APHOL
2-dimethylamino-2-methyl-1-propanol is referred to as DIMEP
$N^1$-(2-hydroxyethyl)-2-methyl-1,2-propanediamine is referred to as NHEMP
Tris(hydroxymethyl)dimethylaminomethane is referred to as THDMM
2-dimethylamino-2-methyl-1,3-propanediol is referred to as DMMPD

*Example I*

This example illustrates a typical method of polymerizing and subsequently pearlizing vinyl acetate-crotonic acid copolymers. In this particular case, the copolymer produced contained 90 parts of vinyl acetate and 10 parts of crotonic acid; however, the same procedure may be employed to make copolymers with other ratios of these monomers, by obvious variation of the respective quantities of these two materials.

The original reaction mixture consisted of 180 parts of vinyl acetate, 4 parts of benzoyl peroxide (polymerization catalyst), 5 parts of crotonic acid and 20 parts ethyl acetate. The solution was maintained at reflux temperature, and 15 additional parts of crotonic acid were added during the course of the polymerization. Ethyl acetate was also added, as required, to maintain a workable viscosity during the polymerization, the total amount of ethyl acetate used amounting to 68 parts. At the completion of the copolymerization, the copolymer solution was dispersed, with agitation, in water containing polyvinyl alcohol. The amount of the polyvinyl alcohol was equivalent to 0.1%, based on the weight of the copolymer solids. Ethyl acetate and any residual vinyl acetate monomer were then removed by distillation, the distillation continuing until the reflux temperature remained constant for 15 minutes at 100° C. The dispersion of the copolymer in water was then centrifuged to separate the copolymer pearls, which were washed, dried, and used as the raw material in the following examples.

*Example II*

This example illustrates the procedure that was used for reacting a 90/10 vinyl acetate-crotonic acid copolymer with an aminohydroxy compound, AMPD.

It was first necessary to calculate the amount of the aminohydroxy compound, in this case AMPD, needed to react with 100% of the theoretical equimolar amount of the crotonic acid in the 90/10 copolymer. The copolymer employed was that described in Example I. 40 grams of these pearls were first dissolved in 60 grams of acetone. Thus, 100 grams of solution contained 40 grams of copolymer, of which 4 parts was crotonic acid. The molecular weight of crotonic acid is 86.09. By dividing the total weight of crotonic acid by its gram molecular weight, we obtained the available number of moles of crotonic acid. Thus, 4 grams/86.09 g./mole equals 0.0465 mole of crotonic acid, which were theoretically available for reaction with the AMPD.

The molecular weight of AMPD is 105.14. Thus, 105.14 g./mole × 0.0465 mole = 4.88 grams AMPD, which was the weight needed to react with 100% of the theoretical equimolar amount of crotonic acid present.

The above calculated amount of 4.88 grams of AMPD was added to the solution of the copolymer in acetone, with continuous agitation. A soluble product resulted, which possessed all the herein described advantageous characteristics. These properties will be more specifically illustrated in the following example.

*Example III*

Following the procedures set forth in Examples I and II, a number of solutions were prepared, containing copolymers of vinyl acetate and crotonic acid which had been reacted with varying amounts of different aminohydroxy compounds.

Using methods well known in the art, 3.0 mil films were cast from these solutions upon glass plates, and then dried at varying temperatures and periods. In order to test the water solubility of these films, they were scraped from the glass and then shaken in a glass cylinder containing water. If a perfectly clear solution resulted, the water solubility of the film was set down as excellent; if a colloidal or turbid solution resulted, water solubility was considered good; failure to dissolve resulted in a rating of poor.

In addition, a series of 1.5 mil films, which had been cast from the same solutions as above, were air dried for one week at 72° F. and then tested for their surface hardness, using a Sward hardness rocker, as sold by the Henry A. Gardner Laboratory Inc. of Bethesda, Md. This device measures surface hardness and, indirectly, flexibility (i.e., those materials which are soft are also generally flexible). The results of these hardness tests were rated on a numerical scale from 0 to 100. Thus, plate glass gives a value of 100, while a value of 0 implies a surface which is so soft as to be tacky. An intermediate value of 50 is obtained for films cast from polyvinyl acetate lacquers, and may be useful in appraising the experimental results, which are described in the following table, together with the results of the above described solubility tests.

| Copolymer [1] Solution | Amino-hydroxy Compound | Percent of Theoretical Equimolar Amount of Copolymer Reacted | Sward Hardness Value | H₂O Solubility of Film Air Dried 1 Week at 72° F. | H₂O Solubility of Film Dried at 125° F. for One Week |
|---|---|---|---|---|---|
| 90/10 ViAc-Crot.[2] Acid in Anhydrous Ethanol. | None | | 44 | Poor | Poor. |
| Do | AMPD | 80 | 32 | Good | Good. |
| Do | AMPD | 90 | 30 | do | Do. |
| Do | AMPD | 100 | 24 | Excellent | Excellent. |
| Do | AMPD | 110 | 18 | do | Do. |
| Do | AMPD | 125 | 16 | do | Do. |
| 90/10 ViAc-Crot. Acid in Methyl Ethyl Ketone. | AMP | 70 | 42 | Good | Good. |
| Do | AMP | 80 | 38 | do | Do. |
| Do | AMP | 90 | 36 | do | Do. |
| 90/10 ViAc-Crot. Acid in Acetone. | AMP | 100 | 30 | Excellent | Do. |
| Do | AMP | 110 | 28 | do | Do. |
| Do | AMP | 125 | 24 | do | Excellent. |
| Do | AMP | 150 | 18 | do | Do. |
| 90/10 ViAc-Crot. Acid in Ethyl Acetate. | AEPD | 70 | 32 | Good | Good. |
| Do | AEPD | 90 | 24 | Excellent | Excellent. |
| Do | AEPD | 100 | 22 | do | Do. |
| Do | AEPD | 110 | 20 | do | Do. |
| Do | AEPD | 125 | 14 | do | Do. |
| 92.5/7.5 ViAc-Crot. Acid in Methyl Acetate. | None | | 40 | Poor | Poor. |
| Do | AMP | 100 | 30 | Good | Good. |
| Do | AMP | 125 | 26 | Excellent | Excellent. |
| Do | AMP | 150 | 20 | do | Do. |
| Do | DIMEP | 125 | 26 | do | Do. |
| Do | AMPN | 125 | 20 | do | Do. |
| 92.5/7.5 ViAc-Crot. Acid in Isopropanol. | None | | 40 | Poor | Poor. |
| Do | AMPD | 90 | 28 | Good | Good. |
| Do | AMPD | 100 | 26 | do | Do. |
| Do | AMPD | 110 | 20 | do | Do. |
| Do | AMPD | 150 | 18 | Excellent | Excellent. |
| 88/12 ViAc-Crot. Acid in Anhydrous Ethanol. | THMAM | 100 | 24 | Good | Good. |
| Do | AMPR | 100 | 28 | do | Do. |
| Do | AMPE | 100 | 24 | do | Do. |
| Do | APHOL | 100 | 22 | do | Do. |
| 87.5/12.5 ViAc-Crot. Acid in Anhydrous Ethanol. | NHEMP | 100 | 26 | Excellent | Do. |
| Do | THDMM | 100 | 20 | Good | Do. |
| Do | DMMPD | 100 | 20 | do | Do. |

[1] All solutions contained 40 parts, by weight, of solids.
[2] ViAc=Vinyl Acetate. Crot. Acid=Crotonic Acid.

The above example thus serves to illustrate the water solubility and flexibility of films cast from solutions of the modified copolymers of our invention.

It should also be noted that in all cases, the modified copolymers were completely soluble in anhydrous ethanol, this being the solvent most often employed in aerosol formulations, particularly for hair spray lacquers.

*Example IV*

To demonstrate use of the products of our invention in adhesive compositions, we prepared a 40% (by weight) ethanol solution of a 90/10 vinyl acetate-crotonic acid copolymer which had been reacted with 100% of the theoretical equimolar amount of AMPD. Two 9" x 12" sheets ("A" and "B") of 50 lb. kraft paper were then given a 1.5 mil coating of this modified polymer and were air dried for 24 hours at 72° F. One of the thus coated sheets ("A") was next moistened with water and applied, with finger pressure, to a sheet of uncoated kraft paper. An excellent adhesive bond was obtained, comparable to that obtained with standard water remoistenable adhesives.

The other coated sheet ("B") was placed in contact with an untreated kraft paper sheet which had been placed in heat sealing apparatus. Thereupon the sheets were bonded by the application of 20 lbs. pressure for one second at a temperature of 250° F. Here too, the resulting bond was found to be of a strength comparable to that attained with other heat seal adhesives.

Similar results were obtained in bonding other materials such as leather, glass, wood, and plastic films either to themselves or to other substances. Variations were also made in the heat-sealing procedure by adhering two surfaces, both of which had been coated with the products of our invention. As would be expected in the case, the sealing temperature could be reduced to 150° F., with no loss of strength in the resulting bond. It was found that lowering of the heat seal temperature, as well as ease of water remoistening, could also be brought about, for any combination of copolymer and aminohydroxy compound, by reacting the copolymer with an amount of aminohydroxy compound which was within the upper ranges of the permissable amount as specified in this invention, e.g. 125–175%. Likewise, it was found that the heat seal temperature could be raised and the ease of water remoistenability reduced by lowering the amount of aminohydroxy compound reacted with the copolymer to within the lower limits of the permissable amount, e.g. 25–75%.

The above example thus serves to illustrate the complete versatility obtainable in adhesive applications with the modified copolymers of our invention.

*Example V*

To demonstrate the compatibility of the aminohydroxy-modified copolymers of our invention with a typical propellant used in aerosol formulations, we prepared a series of 40% solutions (by weight) of the 90/10 vinyl acetate-crotonic acid copolymer in anhydrous ethyl alcohol, the copolymers having been reacted with 80, 90 and 100% of the theoretical equimolar amounts of AMPD. Another 40% solution was prepared, using in this case a copolymer containing 92.5 parts of vinyl acetate and 7.5 parts of crotonic acid, the copolymer having been reacted with 100% of the theoretical equimolar amount of AMPD. Samples of all of these solutions were then combined with equal volumes of monofluoro-trichloromethane, which had been maintained at a temperature of 41° F. The mixtures were shaken vigorously, and then allowed to remain stationary. No perceptible separation or precipitation occurred.

Summarizing, our process makes possible the production of modified vinyl acetate-crotonic acid copolymers which are soluble both in water and in organic solvents. Films cast from solutions or dispersions of these copolymers are water soluble, moderately soft and flexible, without showing any deterioration upon aging. Their unique combination of solubility in anhydrous solvents as well as water, film flexibility, and compatibility with hydrocarbon aerosol propellants, makes them particularly adaptable for use in aerosol formulations. In addition, they produce adhesives with the unusual combination of solvent soluble, water remoistenable and heat sealable properties.

We claim:

1. The reaction product of an aminohydroxy compound having a boiling point above 160° C. at atmospheric pressure and a molecular weight above 85, with a copolymer of vinyl acetate and crotonic acid, the relative proportions of vinyl acetate and crotonic acid in said copolymer being within the range 92.5:7.5 to 87.5:12.5, by weight, said aminohydroxy compound being selected from the class consisting of 2-amino-2-methyl-1,3-propanediol; 2-amino-2-ethyl-1,3-propanediol; 2-amino-2-methyl-1-propanol; tris(hydroxymethyl)-aminomethane; 1-amino-2-methyl-2-propanol; 3-amino-2-pentanol; 2-amino-1-phenyl-1-butanol; 2-dimethylamino-2-methyl-1-propanol; $N^1$-(2-hydroxyethyl)-2-methyl-1,2-propanediamine; tris(hydroxymethyl)dimethylaminoethane; 2-amino-1-butanol; 2-amino-2-methyl-3-pentanol; 2-amino-1-phenyl-1-propanol; 2-dimethylamino-2-methyl-1,3-propanediol; 2-dimethylamino-2-ethyl-1,3-propanediol and $N^1$(2-hydroxypropyl)-2-methyl-1,2-propanediamine.

2. The reaction product of claim 1 in which the amount of aminohydroxy compound is from 25% to 175% of the theoretical equimolar amount of crotonic acid in the copolymer.

3. The reaction product of claim 1 in which said product is in solution in an organic solvent, said solvent being one in which the aminohydroxy compound and the reaction product of said aminohydroxy compound and the copolymer are soluble.

4. A modified copolymer of vinyl acetate and crotonic acid, characterized by solubility in water and in organic solvents, comprising the reaction product of an aminohydroxy compound having a boiling point above 160° C. at atmospheric pressure and a molecular weight above 85, with a copolymer of vinyl acetate and crotonic acid, the relative proportions of vinyl acetate and crotonic acid in said copolymer being within the range 92.5:7.5 to 87.5:12.5, by weight, and the amount of aminohydroxy compound being from 25% to 175% of the theoretical equimolar amount of crotonic acid in said copolymer, said aminohydroxy compound being selected from the class consisting of: 2-amino-2-methyl-1,3-propanediol; 2-amino-2-ethyl-1,3-propanediol; 2-amino-2-methyl-1-propanol; tris(hydroxymethyl)-aminomethane; 1-amino-2-methyl-2-propanol; 3-amino-2-pentanol; 2-amino-1-phenyl-1-butanol; 2-dimethylamino-2-methyl-1-propanol; $N^1$-(2-hydroxyethyl)-2-methyl-1,2-propanediamine; tris(hydroxymethyl)dimethylaminoethane; 2-amino-1-butanol; 2-amino-2-methyl-3-pentanol; 2-amino-1-phenyl-1-propanol; 2-dimethylamino-2-methyl-1,3-propanediol; 2-dimethylamino-2-ethyl-1,3-propanediol and $N^1$-(2-hydroxypropyl)-2-methyl-1,2-propanediamine.

5. An aerosol formulation suitable for use as a hair spray lacquer, comprising an organic solvent solution of the reaction product of an aminohydroxy compound having a boiling point above 160° C. at atmospheric pressure and a molecular weight above 85 with a copolymer of vinyl acetate and crotonic acid, the relative proportions of vinyl acetate and crotonic acid in said copolymer being within the range of 92.5:7.5 to 87.5:12.5, by weight, and the amount of aminohydroxy compound being from 25% to 175% of the theoretical equimolar amount of crotonic acid in said copolymer, together with a halogenated hydrocarbon aerosol propellant, said organic solvent being one in which the aminohydroxy compound and the reaction product of said aminohydroxy compound and the copolymer are soluble, said aminohydroxy compound being selected from the class consisting of 2-amino-2-methyl-1,3-propanediol; 2-amino-2-ethyl-1,3-propanediol; 2-amino-2-methyl-1-propanol; tris(hydroxymethyl)-aminomethane; 1-amino-2-methyl-2-propanol; 3-amino-2-pentanol; 2-amino-1-phenyl-1-butanol; 2-dimethylamino-2-methyl-1-propanol; $N^1$-(2-hydroxyethyl)-2-methyl-1,2-propanediamine; tris(hydroxymethyl) dimethylaminomethane; 2-amino-1-butanol; 2-amino-2-methyl-3-pentanol; 2-amino-1-phenyl-1-propanol; 2-dimethylamino-2-methyl-1,3-propanediol; 2-dimethylamino-2-ethyl-1,3-propanediol and $N^1$-(2-hydroxypropyl)-2-methyl-1,2-propanediamine.

6. The aerosol formulation of claim 5 in which the organic solvent is anhydrous ethanol.

7. A base coated with an adhesive film, said film comprising the dried coating of a solution of the reaction product of an aminohydroxy compound having a boiling point above 160° C. at atmospheric pressure and a molecular weight above 85, with a copolymer of vinyl acetate and crotonic acid, the relative proportions of vinyl acetate and crotonic acid in said copolymer being within the range of 92.5:7.5 to 87.5:12.5, by weight, said aminohydroxy compound being selected from the class consisting of 2-amino-2-methyl-1,3-propanediol; 2-amino-2-ethyl-1,3-propanediol; 2-amino-2-methyl-1-propanol; tris(hydroxymethyl)-aminomethane; 1-amino-2-methyl-2-propanol; 3-amino-2-pentanol; 2-amino-1-phenyl-1-butanol; 2-dimethylamino-2-methyl-1-propanol; $N^1$-(2-hydroxyethyl)-2-methyl-1,2-propanediamine; tris(hydroxymethyl)-2-methyl-1,2-propanediamine; tris(hydroxymethyl)dimethylaminomethane; 2-amino-1-butanol; 2-amino-2-methyl-3-pentanol; 2-amino-1-phenyl-1-propanol; 2-dimethylamino-2-methyl-1,3-propanediol; 2-dimethylamino-2-ethyl-1,3-propanediol and $N^1$-(2-hydroxypropyl)-2-methyl-1,2-propanediamine.

8. The method of making a modified copolymer of vinyl acetate and crotonic acid characterized by solubility in water and in organic solvents, comprising mixing an aminohydroxy compound having a boiling point above 160° C. at atmospheric pressure and a molecular weight above 85, with a copolymer of vinyl acetate and crotonic acid, in an organic solvent, said solvent being one in which the aminohydroxy compound and the reaction product of said aminohydroxy compound and the copolymer are soluble, the relative proportions of vinyl acetate and crotonic acid in said copolymer being within the range 92.5:7.5 to 87.5:12.5, by weight, said aminohydroxy compound being selected from the class consisting of 2-amino-2-methyl-1,3-propanediol; 2-amino-2-ethyl-1,3-propanediol; 2-amino-2-methyl-1-propanol; tris(hydroxymethyl)-aminomethane; 1-amino-2-methyl-2-propanol; 3-amino-2-pentanol; 2-amino-1-phenyl-1-butanol; 2-dimethylamino-2-methyl-1-propanol; $N^1$-(2-hydroxyethyl)-2-methyl-1,2-propanediamine; tris(hydroxymethyl)dimethylaminomethane; 2-amino-1-butanol; 2-amino-2-methyl-3-pentanol; 2-amino-1-phenyl-1-propanol; 2-dimethylamino-2-methyl-1, 3-propanediol; 2-dimethylamino-2-ethyl-1,3-propanediol and N¹-(2-hydroxypropyl)-2-methyl-1,2-propanediamine.

9. The method of claim 8 in which the copolymer of vinyl acetate and crotonic acid is added in the form of beads to a solution of the aminohydroxy compound in the organic solvent.

10. The method of claim 8 in which the amount of aminohydroxy compound is from 25% to 175% of the theoretical equimolar amount of crotonic acid in said copolymer.

11. The method of claim 8 in which the organic solvent is anhydrous ethanol.

References Cited in the file of this patent

UNITED STATES PATENTS

| | | |
|---|---|---|
| 2,676,938 | Clark | Apr. 27, 1954 |
| 2,831,837 | Evans et al. | Apr. 22, 1958 |
| 2,835,997 | Steinhilber | May 27, 1958 |